United States Patent

Sagmuller et al.

[15] 3,688,544
[45] Sept. 5, 1972

[54] EXTRUSION DIE ASSEMBLY

[72] Inventors: Joseph R. Sagmuller; John F. Joyce; Hoy O. McIntire, all of Columbus, Ohio

[73] Assignee: National-Standard Company, Niles, Mich.

[22] Filed: July 24, 1970

[21] Appl. No.: 58,072

[52] U.S. Cl. ............... 72/261, 72/262, 425/382, 425/464
[51] Int. Cl. ................ B21c 23/00, B29f 3/00
[58] Field of Search ....... 72/262, 261; 18/12 SE, 8 SS

[56] References Cited

UNITED STATES PATENTS 2,593,265  4/1952  Chase .................. 72/262 X

FOREIGN PATENTS OR APPLICATIONS 340,192  5/1936  Italy ..................... 72/262

*Primary Examiner*—Charles W. Lanham
*Assistant Examiner*—R. M. Rogers
*Attorney*—Johnson, Dienner, Emrich, Verbeck & Wagner

[57] ABSTRACT

An extrusion die assembly embodying an arrangement of components including a die component at the end of an auger screw contained within an auger barrel to prevent retention of extrudable material in the space between the end of the auger screw and the die component.

4 Claims, 4 Drawing Figures

PATENTED SEP 5 1972
3,688,544
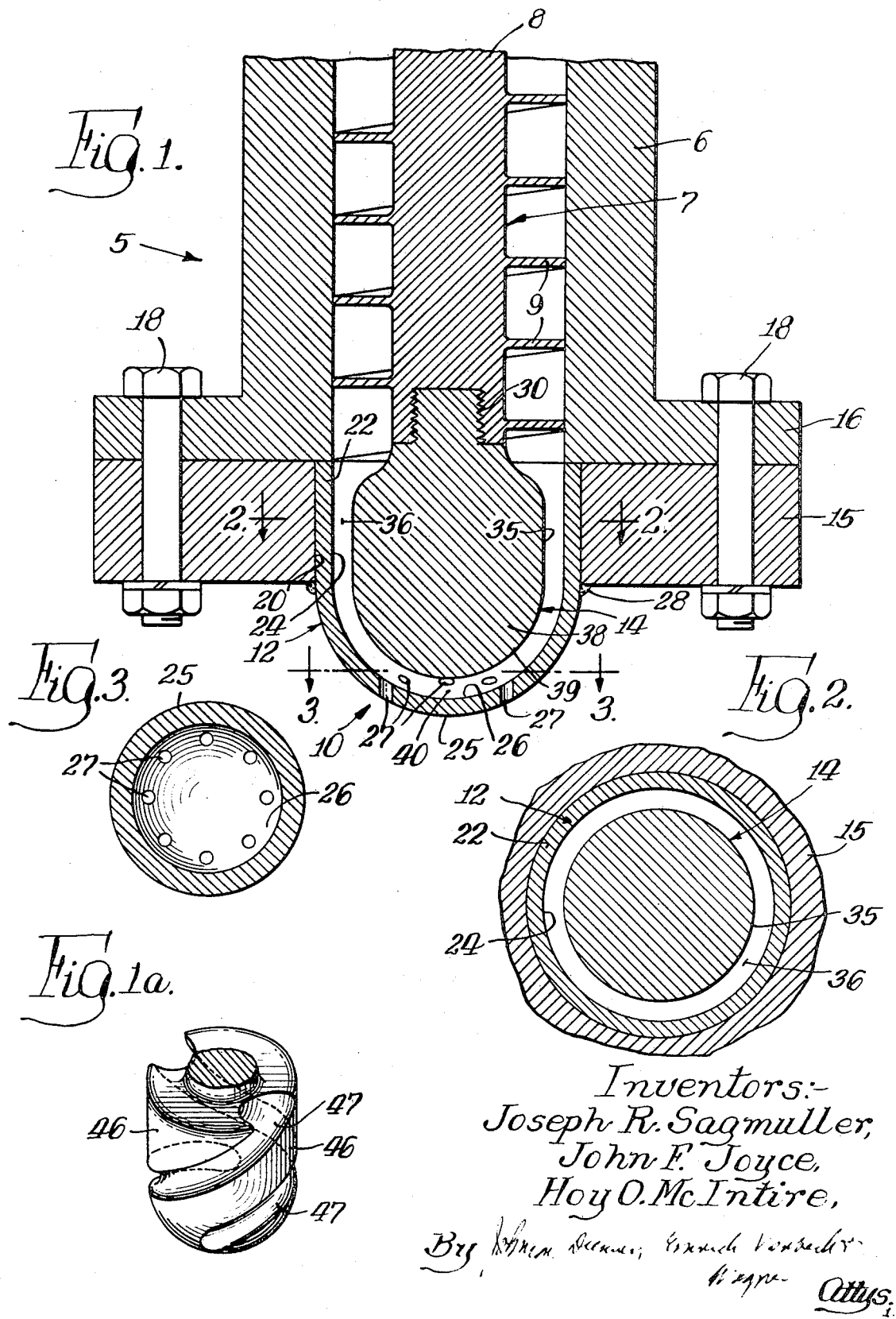
Inventors:-
Joseph R. Sagmuller,
John F. Joyce,
Hoy O. McIntire,
By
Attys.

EXTRUSION DIE ASSEMBLY

In the fabrication of an elongated article, such as wire, tubing or strip formed by extruding extrudable material such as metal powders or metal compounds into a continuous elongated extrusion which is then reduced and sintered, no particular difficulty exists when the die plate of the extruding apparatus has but a single die orifice. However, utilizing extruding apparatus for the formation of a single article, such as wire, is usually uneconomical, although the invention of the present invention may be so utilized if desired. Thus, for economical purposes it is highly desirable that a large number of extruded articles be formed simultaneously for subsequent processing such as reducing and sintering of the several extrudates. It has been found by employing the known expedients in extruding a single elongated extrudate but having die plates formed with plurality of die orifices, that the simultaneous extrusion of a plurality of extrudates from die orifice to die orifice cannot be accomplished satisfactorily.

A typical metal compound with which the present invention may be employed was produced in the following manner. The by-product iron oxide, from spent pickle liquor recovery was first calcined at a temperature of 850° F. for eight hours to drive off residual chlorine which tends to damage equipment. The calcined oxide was then ball milled for 3 hours which resulted in a material with a mean particle size of 5 microns as determined by Coulter Counter measurements. The material last referred to has a particle size in which about 50 percent of the iron oxide particles are less than 5 microns and the remainder in a range of 5 to 40 microns. As aforementioned, the micron sizes were determined by a Coulter counter measurement and it will be understood that particle size means sizes thus determined. A binder was then prepared composed of 140 grams cornstarch (not pregelatinized) and 564 milliliters of water and the solution was heated until it formed a gel. The aforementioned binder was then intimately mixed with 4,000 grams of the above described iron oxide together with 140 milliliters of glycerine and 19 milliliters of saturated NaOH solution to provide a compact which may be extruded with the extruding apparatus of this invention.

The aforedescribed metal compound is disclosed as being illustrative of a metal compound which may be successfully extruded with the extruding apparatus of this invention, and it will be understood many other extrudable materials may be employed with the invention.

THE INVENTION

In view of the foregoing, the present invention addresses itself to providing an extruding apparatus embodying an arrangement of components at the end of an auger screw including a die component to prevent retention of extrudable material in the space between the auger screw and the die component.

This problem has been solved according to the present invention by providing a die component at the outlet of the auger housing having an inlet including an inner cylindrical surface and an outer end portion having an inner surface from which one or more die orifices open outwardly. A nose component is disposed at the outer end of the auger screw and is provided with an outer cylindrical surface and an outer end portion having an outer surface. The inner cylindrical surface of the die component together with the outer cylindrical surface of the nose component define an annular chamber for receiving the material extruded by the auger screw for passage into a chamber formed between the outer surface of the end portion of the nose component and the inner surface of the end portion of the die component.

BRIEF DESCRIPTION OF THE DRAWINGS

FIG. 1 is a vertical sectional view of the lower end of an extruder constructed in accordance with the principles of the invention;

FIG. 1a is a perspective view of a modified form of nose component for the outer end of the auger screw of the apparatus of FIG. 1.

FIG. 2 is a detail horizontal sectional view taken along the line 2—2 of FIG. 1 looking in a direction indicated by the arrows; and FIG. 3 is a detail horizontal sectional view taken along the line 3—3 of FIG. 1 looking in a direction indicated by the arrows.

Referring now to the drawings, there is shown the lower end portion of a known conventional extruder 5 comprising an outer barrel 6 within which an auger screw 7 is contained for advancing extrudable material through the auger barrel and the outlet thereof. The auger screw 7 comprises a conventional rotatably mounted shaft 8, driven in any suitable manner, upon which a plurality of axially spaced flights 9 are mounted.

The extrusion assembly 10 of the present invention is disposed adjacent the outlet end of the extruder 5 and comprises a die component 12 and a nose component 14. The die component 12 is adapted to be supported adjacent the outlet of the extruder in an annular flange 15 secured to the flange 16 at the outlet end of the auger barrel as by a plurality of nut and bolt means 18. The annular flange 15 is formed with an inner annular bore 20 for receiving an inlet portion 22 of the die component 12 which is defined by a cylindrical inner surface portion 24 and an outer end portion 25 having an inner surface 26 through which a plurality of die orifices 27 project. The die component 12 is retained in flange 15 as by welding as indicated at 28. The nose component 14 is provided with a threaded projection 30 for threading into the end of the auger shaft 8 adjacent the discharge opening of the auger barrel. The nose portion 14 at the outer end of the auger screw is provided with an outer cylindrical surface 35 which together with the inner cylindrical surface 24 of the die component define an annular chamber 36 for receiving extrudable material from the outlet of the auger barrel.

The nose component 14 at its outer end is formed with an end portion 38 having an outer surface 39 which together with the inner surface 26 of the die component define a chamber 40 in communication with the aforedescribed annular chamber 36.

The surface 39 of the end portion 38, and the inner surface 26 of the die component, as shown in FIG. 1, are of hemispherical configuration but may, if desired, deviate from true hemispherical, such as oval, and it is to be understood that the word hemispherical as used in this specification and claims includes deviations as above noted.

In the operation of the foregoing apparatus rotation of the auger screw through the flights 9 thereof deliver extrudable material into the inlet of the annular chamber 36 from which it passes to the hemispherical chamber 40 for passage through the die orifices 27 to thus provide for extrusion of a plurality of continuous elongated extrudate of the material contained within the auger barrel. As previously noted the die component 12 may be provided with but a single die orifice 27 for the extrusion of a single continuous extrudate.

The arrangement of the die component at the outlet of the auger barrel and the nose component at the end of the auger screw with the relationship above described thus eliminates dead space between the end of the auger screw and the aforedescribed components. In providing the die component 12 with a plurality of die orifices 27 several extrudates simultaneously pass through the die orifices enabling their convenient subsequent treatment, such as reducing and sintering as before described. In the embodiment of FIG. 1a, the nose component 45 there shown may be substituted for nose component 14 of FIG. 1. The nose component 45 as shown is provided with flights 46 formed by spiral grooves 47 which may be likened to that of a conventional drill bit. The utilization of nose component 45 in the apparatus of FIG. 1 assures that no dead spaces will be created in extruding extrudable material through the die orifices One or more of the die orifices 27 may be of a configuration to provide for the extrusion of one or more elongated extrudates of desired cross-sectional configuration.

The invention claimed is:

1. An extrusion assembly for use at the discharge end of an auger barrel containing an auger screw for advancing extrudable material through the auger barrel and through the discharge end thereof, the combination of a die component having an inlet portion at the outlet of the auger housing including an inner cylindrical surface of substantially uniform cross section along its longitudinal axis, and an outer end portion having an inner hemispherical surface from which at least one die orifice opens outwardly, a nose component at the end of the auger screw having an outer cylindrical surface at the end adjacent the end of the auger screw which together with the inner cylindrical surface of said die component define an annular chamber for receiving material discharged by the auger screw through the discharge end of the auger barrel, and said nose component having an outer end portion having a hemispherical end surface which together with the inner end hemispherical surface of said die component define a chamber for receiving material from said annular chamber for extruding through said at least one die orifice.

2. The extruder assembly of claim 1 in which said nose component is mounted on the outer end of the auger screw.

3. The extruder assembly of claim 2 in which said die component is supported by flange means mounted at the outer end of the auger barrel.

4. The extruder assembly of claim 2 in which said nose components have flights on the outer surface thereof.

* * * * *